(12) United States Patent
Hasegawa et al.

(10) Patent No.: US 10,528,608 B2
(45) Date of Patent: Jan. 7, 2020

(54) QUERIES

(71) Applicant: International Business Machines Corporation, Armonk, NY (US)

(72) Inventors: Mihoko Hasegawa, Tokyo (JP); Ryoji Kurosawa, Tokyo (JP); Kensuke Matsuoka, Chiba (JP); Fumihiko Terui, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 476 days.

(21) Appl. No.: 15/255,559

(22) Filed: Sep. 2, 2016

(65) Prior Publication Data

US 2018/0067942 A1  Mar. 8, 2018

(51) Int. Cl.
  *G06F 16/00* (2019.01)
  *G06F 16/33* (2019.01)
(52) U.S. Cl.
  CPC .................. *G06F 16/3346* (2019.01)
(58) Field of Classification Search
  CPC combination set(s) only.
  See application file for complete search history.

(56) References Cited

U.S. PATENT DOCUMENTS

| | | | |
|---|---|---|---|
| 9,135,308 | B2 | 9/2015 | Bhalotia |
| 9,355,179 | B2 | 5/2016 | Kuo et al. |
| 2007/0203895 | A1* | 8/2007 | Eslambolchi ......... G06F 16/951 |
| 2008/0091670 | A1* | 4/2008 | Ismalon ............... G06F 16/3322 |
| 2012/0310930 | A1* | 12/2012 | Kumar .................. G06F 16/345 |
| | | | 707/728 |
| 2016/0034997 | A1 | 2/2016 | Amacker |

OTHER PUBLICATIONS

King et al. Computer-Assisted Keyword and Document Set Discovery from Unstructured Text; 2014; www.semanticscholar.org (Year: 2014).*
Hasegawa et al., "Improving Queries," U.S. Appl. No. 15/805,836, filed Nov. 7, 2017.
List of IBM Patents or Patent Applications Treated As Related; Date Filed: Sep. 2, 2016, 2 pages.
King et al. Computer-Assisted Keyword and Document Set Discovery from Unstructured Text; 2014; www.sematicscholar.org (Year:2014).

* cited by examiner

*Primary Examiner* — Tamara T Kyle
*Assistant Examiner* — Lahcen Ennaji
(74) *Attorney, Agent, or Firm* — Cantor Colburn LLP; Robert Bunker

(57) ABSTRACT

Embodiments are directed to a computer implemented method of improving queries. The method includes performing a query on a document set, wherein documents that satisfy the query comprise a first subset of the document set and documents that do not satisfy the query comprise a complement subset. Thereafter, calculating a correlation for all terms in the complement subset, with respect to the complement subset. Thereafter determining a set of top correlated terms. A set of bottom correlated terms is determined. The set of top correlated terms and bottom correlated terms are presented to generate an improved query.

13 Claims, 7 Drawing Sheets

QUERIES

BACKGROUND

The embodiments described herein relate in general to the field of computing. More specifically, the embodiments described herein relate to systems and methodologies for the improving the quality of queries.

There is an increased desire for users to use search engines to find documents and other information. General purpose search engines (such as Google™ and Bing™) are optimized to find the most relevant content. However, there are circumstances in which it is desirable for a search to return as many relevant results as possible, instead of merely the most relevant results.

SUMMARY

Embodiments are directed to a computer-implemented method of improving a query. The method includes performing a query on a document set, wherein documents that satisfy the query comprise a first subset of the document set and documents that do not satisfy the query comprise a complement subset. Thereafter, calculating a correlation for all terms in the complement subset, with respect to the complement subset. Thereafter determining a set of top correlated terms. A set of bottom correlated terms is determined. The set of top correlated terms and bottom correlated terms are presented to generate an improved query.

Embodiments are further directed to a computer system for improving a query. The system includes a memory and a processor system communicatively coupled to the memory. The processor is configured to perform a method that includes performing a query on a document set, wherein documents that satisfy the query comprise a first subset of the document set and documents that do not satisfy the query comprise a complement subset. Thereafter, calculating a correlation for all terms in the complement subset, with respect to the complement subset. Thereafter determining a set of top correlated terms. A set of bottom correlated terms is determined. The set of top correlated terms and bottom correlated terms are presented to generate an improved query.

Embodiments are further directed to a computer program product for improving a query. The computer program product includes a computer-readable storage medium having program instructions embodied therewith, wherein the computer-readable storage medium is not a transitory signal per se. The program instructions are readable by a processor system to cause the processor system to perform a method that includes performing a query on a document set, wherein documents that satisfy the query comprise a first subset of the document set and documents that do not satisfy the query comprise a complement subset. Thereafter, calculating a correlation for all terms in the complement subset, with respect to the complement subset. Thereafter determining a set of top correlated terms. A set of bottom correlated terms is determined. The set of top correlated terms and bottom correlated terms are presented to generate an improved query.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

Figure 1:
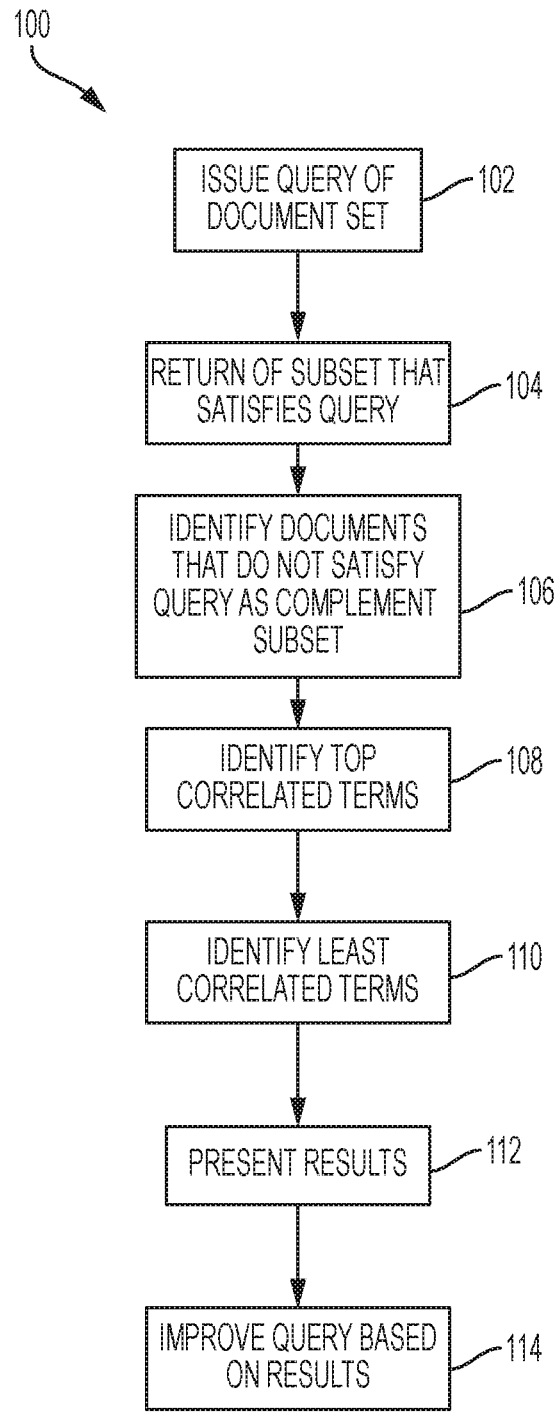
FIG. 1 depicts a flow diagram illustrating the operation of an exemplary embodiment.

In the accompanying figures and following detailed description of the disclosed embodiments, the various elements illustrated in the figures are provided with three digit reference numbers. The leftmost digits of each reference number corresponds to the figure in which its element is first illustrated.

DETAILED DESCRIPTION

Various embodiments of the present invention will now be described with reference to the related drawings. Alternate embodiments may be devised without departing from the scope of this invention. Various connections might be set forth between elements in the following description and in the drawings. These connections, unless specified otherwise, may be direct or indirect, and the present description is not intended to be limiting in this respect. Accordingly, a coupling of entities may refer to either a direct or an indirect connection.

Additionally, although a detailed description of a computing device is presented, configuration and implementation of the teachings recited herein are not limited to a particular type or configuration of computing device(s). Rather, embodiments are capable of being implemented in conjunction with any other type or configuration of wireless or non-wireless computing devices and/or computing environments, now known or later developed.

Furthermore, although a detailed description of search algorithms is included herein, implementation of the teachings recited herein are not limited to embodiments described herein. Rather, embodiments are capable of being implemented in conjunction with any other type of searching system, now known or later developed.

At least the features and combinations of features described in the immediately present application, including the corresponding features and combinations of features depicted in the figures amount to significantly more than implementing a method of searching databases and present results in a particular technological environment. Additionally, at least the features and combinations of features described in the immediately preceding paragraphs, including the corresponding features and combinations of features depicted in the figures go beyond what is well-understood, routine and conventional in the relevant field(s).

Traditional search algorithms can use a technique that suggests characteristic terms based on the relevance of the characteristic in comparison to the search results. However, the result can be that documents that do not meet the exact criteria tend to be ignored. There are certain circumstances in which documents that are relevant, but do not meet the exact search criteria, should not be overlooked. While there are many different circumstances in which this can be true, an exemplary situation in which search breadth is important is in electronic discovery for litigation. In those situations, it can be desirable for a search result to be more comprehensive and return as close to 100% of the relevant documents as possible.

Figure 5:
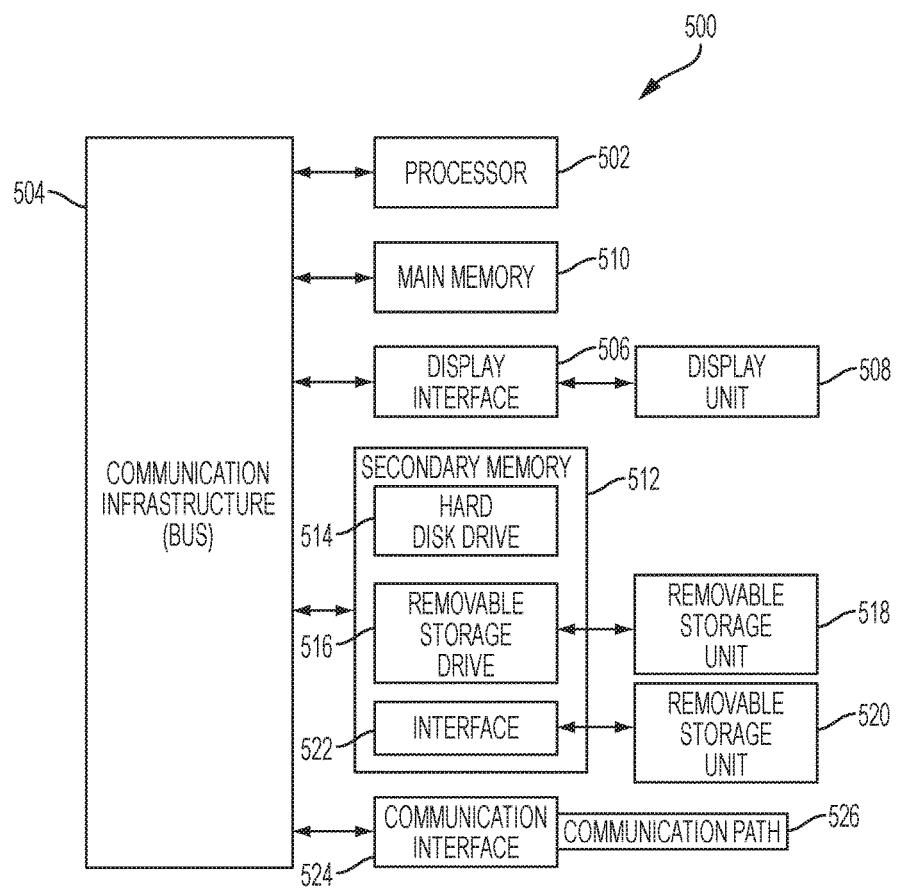
FIG. 5 depicts a computer system capable of implementing hardware components of one or more embodiments.

A flowchart illustrating a method 100 of implementing a search algorithm is presented in FIG. 1. Method 100 is merely exemplary and is not limited to the embodiments presented herein. Method 100 can be employed in many different embodiments or examples not specifically depicted or described herein. In some embodiments, the procedures, processes, and/or activities of method 100 can be performed in the order presented. In other embodiments, one or more of the procedures, processes, and/or activities of method 100 can be combined or skipped. In some embodiments, portions of method 100 can be implemented by computer system 500 (FIG. 5).

Method 100 is a brief overview of an exemplary process. Further details of each block will be provided later. Given document set X, a user issues a query of the document set (block 102). The query is made of a document set X. The documents that satisfy the query are identified as subset A (block 104). The documents that were not returned from the search result is termed X-A (also known as a complement subset). A correlation is calculated for all terms appearing in the X-A (or complement) subset (block 106). The top $N_T$ terms (most correlated terms) are identified (block 108). The bottom $N_B$ terms (least correlated terms) are identified (block 110). The identification of both the $N_T$ terms and the bottom $N_B$ terms is based on the correlation calculated in block 106. The $N_T$ terms and the bottom $N_B$ terms are presented or displayed on a user interface (block 112). The user is then able to improve the query based on the displayed $N_T$ terms and the bottom $N_B$ terms (block 114).

Figure 2:
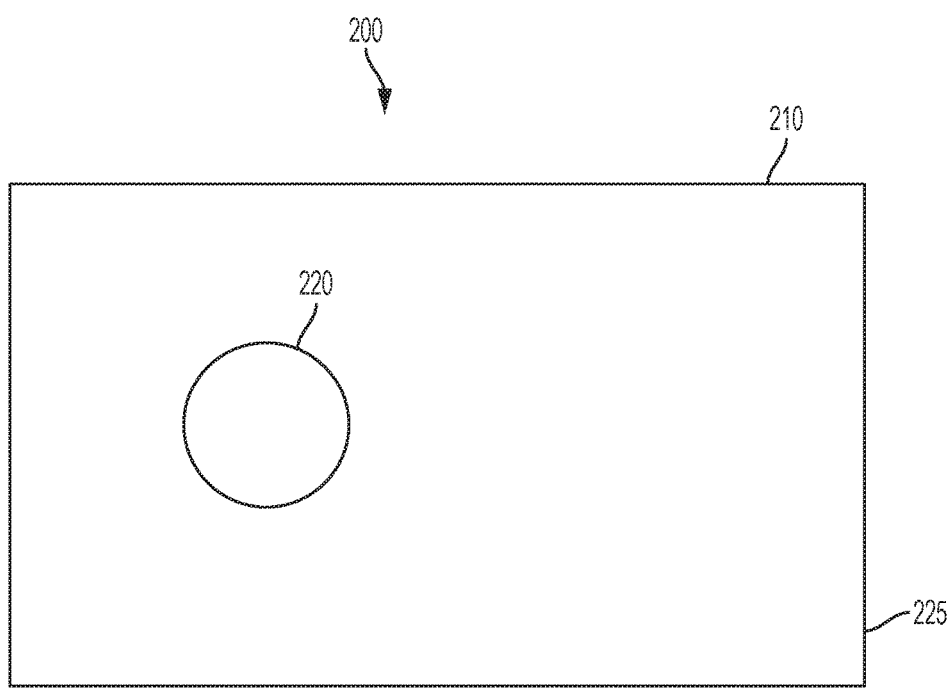
FIG. 2 depicts a Venn diagram illustrating a document set upon which a query is performed.

To further explain method 100, with reference to FIG. 2, a graphical depiction 200 of the document set X being searched is presented. Box 210 represents document set X. As explained above, embodiments of the present invention can be used to search a wide variety of different types of documents. Some embodiments can be used during electronic discovery of a litigation matter. In litigation, the parties to a lawsuit will provide documents to each other, in a process called discovery (including any mandatory disclosures). One objective during discovery might be to find all documents relevant to a search, in order to find documents that help a particular litigation matter.

Document set X is represented by box 210. In an electronic discovery (also known as eDiscovery) embodiment, document set X can be all the documents provided during discovery (possibly all documents provided by one side during discovery).

Document subset A is represented by circle 220. As explained above with respect to block 104, document subset A is a subset of the document set X, hence can be represented by a circle 220 being completely within box 210. The area of the document set X that is not within document subset A can be referred to as X-A or as the complement subset 225.

A correlation of terms can be defined as a statistical relationship between two sets of data. One way of mathematically expressing correlation of term t with respect to document set D in an embodiment is as follows:

$$Cor(D,t) = (\#\text{intersection}(D,E(t))/\#D)/(\#E(t)/\#Y)$$

In the above equation, Y is the document set of interest, t is a term for which correlation is being calculated, D is a document set for which correlation is being calculated, E(t) is a document set that includes the term t, #D is the number of documents in set D, #E(t) is the number of documents in set E(t), and #Y is the number of documents in set Y.

A high correlation indicates a higher likelihood that the term t exists within set D than in set Y. A low correlation indicates a lower likelihood that term t exists within set D than in set Y.

Returning to FIGS. 1 and 2, block 106 is directed to finding the correlation between each term found in X-A and A. In other words, a high correlation indicates the term t appears more frequently in subset A than in set X.

Figure 3:
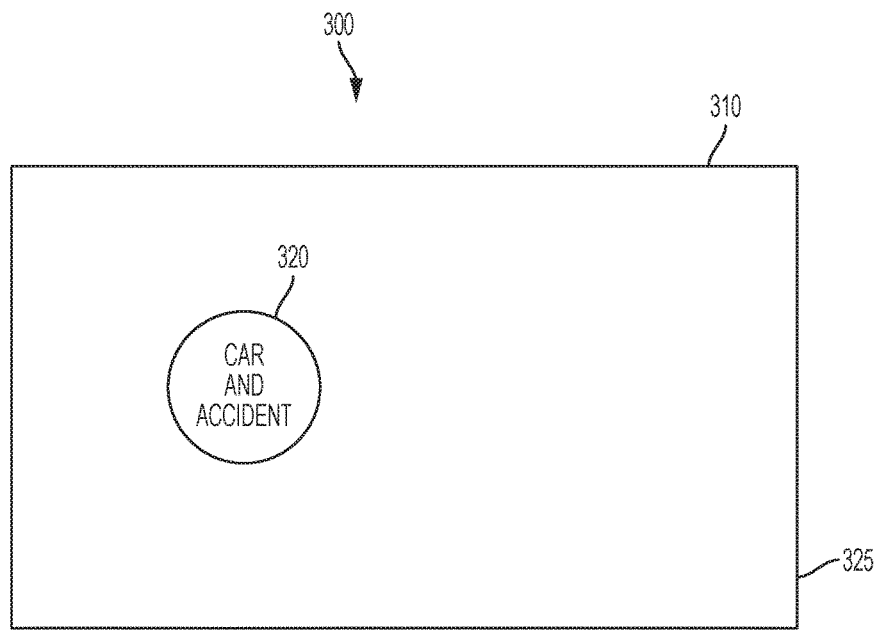
FIG. 3 depicts a Venn diagram illustrating a document set upon which a query is performed, along with search condition.

An exemplary situation will now be presented with reference to FIG. 3. In this hypothetical, the litigation involves an insurance company and one of the parties in the litigation wants to look at the insurance company's history of car insurance payouts for accidents.

FIG. 3 presents a Venn diagram 300 illustrating the various sets in issue in this exemplary litigation matter. A user receives the entire set of documents provided by the insurance company (set 310). A user might enter a query for the term "car" AND "accident." The result of this search is subset 320. The set of documents that are not in the search result (referred to as X-A in FIG. 2) is complement subset 325. Thereafter, a correlation is generated for all terms in subset 325, compared to subset 320 and the terms are ranked.

The top $N_T$ terms are the terms that mainly exist outside subset 320, where $N_T$ is a number that is defined by a user. If the top terms contain terms that are related to a certain eDiscovery request, the implication is that a related document set exists that is mostly outside subset 320. It's possible that the query was too strict and that relevant documents were wrongly excluded from the query.

Figure 4A:
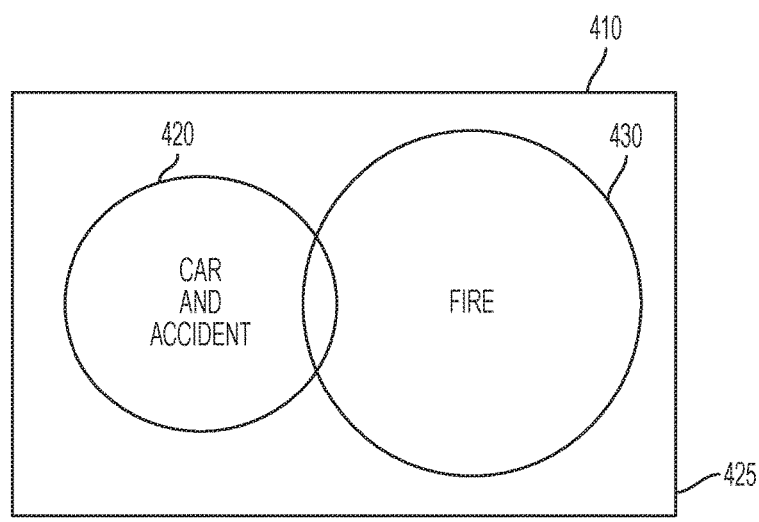
FIG. 4A depicts a Venn diagram illustrating a highly correlated document subset.

A user might be interested in the top 10 terms, for example. With reference to FIG. 4A an exemplary diagram similar to FIG. 3 is presented. Like FIG. 3, there is a set of documents 410. The documents returned by the query comprise subset 420. The documents not part of subset 420 comprise complement subset 425. The term "fire" might be one of the top 10 terms. This indicates that the term "fire" is dominant or occurs very often in complement subset 425. While the term "fire" might largely occur in complement subset 425, there may be on overlap with subset 420. (This is illustrated by subset 430, the subset of documents of subset 425 that contains the term "crash"). In such a manner, a user can modify the query by adding the term fire (e.g., ("accident" AND "car") OR "fire.")

$N_B$ is also a number defined by the user. In some embodiments, $N_B$ can be equal to $N_T$. In other embodiments, the user might be more interested in the top correlation terms than the bottom correlation terms and the have $N_T$ greater than $N_B$. In other embodiments, the user might be more interested in the bottom correlation terms than the top correlation terms and the have $N_T$ less than $N_B$.

Figure 4B:
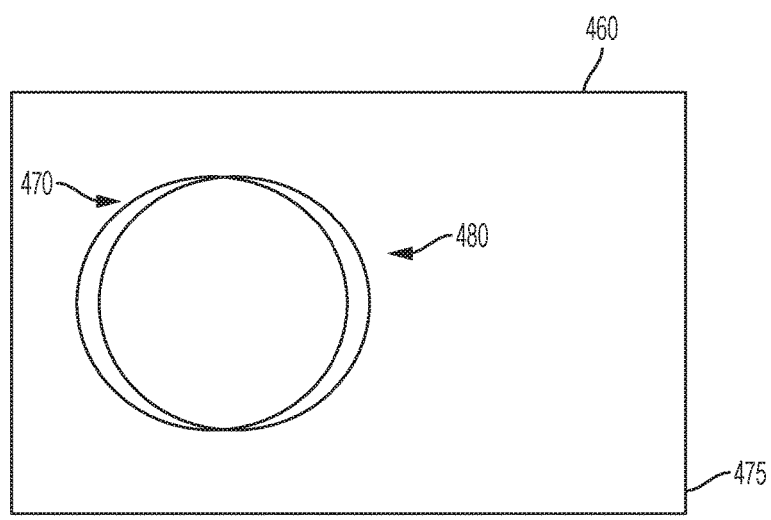
FIG. 4B depicts a Venn diagram illustrating a lowly correlated document subset.

With reference to FIG. 4B an exemplary diagram similar to FIG. 4A is presented. Like FIG. 4A, there is a set of documents 460. The documents returned by the query comprise subset 470. The bottom $N_B$ terms indicates the bottom terms (sorted by correlation) that are contained in many of the documents in subset 470 but few documents in complement subset 475. (In other words, the term "crash" is largely within subset 470 as opposed to complement subset 475).

However, there can still be a small number of documents outside subset 470 that contain the term "crash." (As illustrated by subset 480 and its intersection with subset 470). A user might consider relaxing the query to include such terms. For example, the term "crash" might appear as one of the bottom $N_B$ terms. A user might want to add the term to the query (e.g., ("accident" AND "car") OR "crash")

A review of the suggested terms might find a word that is completely unrelated to the desired query in either the top $N_T$ terms or the bottom $N_B$ terms. For example, one of the top $N_T$ terms might be Haggis. A user who realizes that Paul Haggis directed the movie "Crash" would know that any reference to Haggis is irrelevant to the desired query. Therefore, such a user might want to eliminate "Haggis" from the search results. For example, the query can be modified to read ("accident" AND "car") AND NOT "Haggis," which would eliminate any result related to Haggis. Thus, in reference to FIG. 4A, there can be situations where one wants to remove the intersection between subset 420 and subset 430.

There are a variety of different ways in which results can be used. In some embodiments, there can be a user interface ("UI") that displays results, such as the $N_T$ terms and the bottom $N_B$ terms, to a user. In such a manner, a user can review the results and determine which search terms should be added or removed from a query to achieve a desired result. In some embodiments, suggested queries can be automatically determined or generated based on the result and displayed to a user. Thereafter, the user would select an automatically generated query, whereupon the query would automatically execute. In some embodiments, suggested query modifications can be automatically executed without user input.

FIG. 5 depicts a high level block diagram computer system 500, which may be used to implement one or more embodiments. More specifically, computer system 500 may be used to implement hardware components of systems capable of performing methods described herein. Although one exemplary computer system 500 is shown, computer system 500 includes a communication path 526, which connects computer system 500 to additional systems (not depicted) and may include one or more wide area networks (WANs) and/or local area networks (LANs) such as the Internet, intranet(s), and/or wireless communication network(s). Computer system 500 and additional system are in communication via communication path 526, e.g., to communicate data between them.

Computer system 500 includes one or more processors, such as processor 502. Processor 502 is connected to a communication infrastructure 504 (e.g., a communications bus, cross-over bar, or network). Computer system 500 can include a display interface 506 that forwards graphics, textual content, and other data from communication infrastructure 504 (or from a frame buffer not shown) for display on a display unit 508. Computer system 500 also includes a main memory 510, preferably random access memory (RAM), and may also include a secondary memory 512. Secondary memory 512 may include, for example, a hard disk drive 514 and/or a removable storage drive 516, representing, for example, a floppy disk drive, a magnetic tape drive, or an optical disc drive. Hard disk drive 514 can be in the form of a solid state drive (SSD), a traditional magnetic disk drive, or a hybrid of the two. There also may be more than one hard disk drive 514 contained within secondary memory 512. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disc, etc. which is read by and written to by removable storage drive 516. As will be appreciated, removable storage unit 518 includes a computer-readable medium having stored therein computer software and/or data.

In alternative embodiments, secondary memory 512 may include other similar means for allowing computer programs or other instructions to be loaded into the computer system. Such means may include, for example, a removable storage unit 520 and an interface 522. Examples of such means may include a program package and package interface (such as that found in video game devices), a removable memory chip (such as an EPROM, secure digital card (SD card), compact flash card (CF card), universal serial bus (USB) memory, or PROM) and associated socket, and other removable storage units 520 and interfaces 522 which allow software and data to be transferred from the removable storage unit 520 to computer system 500.

Computer system 500 may also include a communications interface 524. Communications interface 524 allows software and data to be transferred between the computer system and external devices. Examples of communications interface 524 may include a modem, a network interface (such as an Ethernet card), a communications port, or a PC card slot and card, a universal serial bus port (USB), and the like. Software and data transferred via communications interface 524 are in the form of signals which may be, for example, electronic, electromagnetic, optical, or other signals capable of being received by communications interface 524. These signals are provided to communications interface 524 via communication path (i.e., channel) 526. Communication path 526 carries signals and may be implemented using wire or cable, fiber optics, a phone line, a cellular phone link, an RF link, and/or other communications channels.

In the present description, the terms "computer program medium," "computer usable medium," and "computer-readable medium" are used to generally refer to media such as main memory 510 and secondary memory 512, removable storage drive 516, and a hard disk installed in hard disk drive 514. Computer programs (also called computer control logic) are stored in main memory 510 and/or secondary memory 512. Computer programs may also be received via communications interface 524. Such computer programs, when run, enable the computer system to perform the features discussed herein. In particular, the computer programs, when run, enable processor 502 to perform the features of the computer system. Accordingly, such computer programs represent controllers of the computer system. Thus it can be seen from the forgoing detailed description that one or more embodiments provide technical benefits and advantages.

Figure 6:
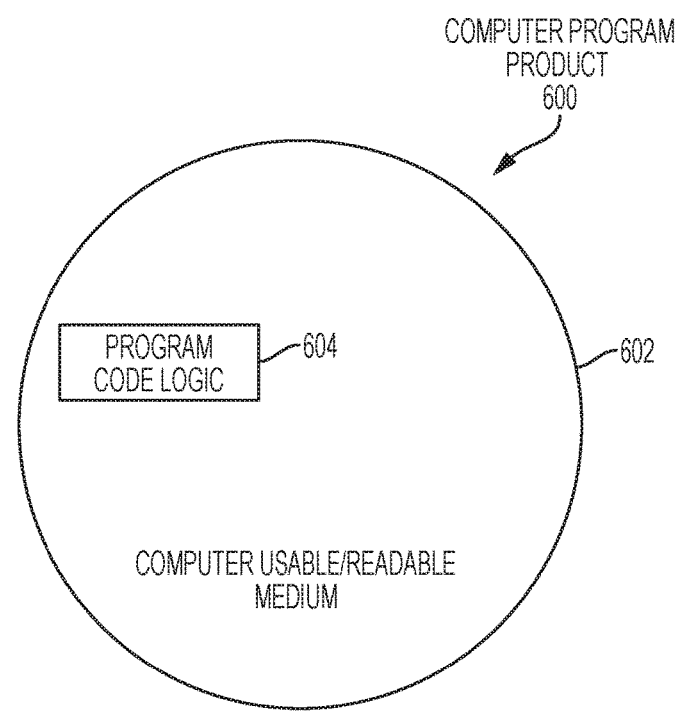
FIG. 6 depicts a diagram of a computer program product according to one or more embodiments.

Referring now to FIG. 6, a computer program product 600 in accordance with an embodiment that includes a computer-readable storage medium 602 and program instructions 604 is generally shown.

Embodiments may be a system, a method, and/or a computer program product. The computer program product may include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments may include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

What is claimed is:

1. A computer system comprising:
a memory; and
a processor system communicatively coupled to the memory;
the processor system configured to perform a method comprising:
performing a query on a document set, wherein documents that satisfy the query comprise a first subset of the document set and documents that do not satisfy the query comprise a complement subset;
calculating a respective correlation between the query and all terms in the complement subset, wherein the correlation is based on a likelihood that a term in the complement set appears in the first subset;
determining a set of top correlated terms, wherein a number of the top correlated terms is a user defined number;
determining a set of bottom correlated terms, wherein a number of the bottom correlated terms is a user defined number; and
presenting the set of top correlated terms and bottom correlated terms to generate an improved query.

2. The computer system of claim 1 wherein:
presenting the set of top correlated terms and bottom correlated terms comprises causing the top correlated terms and bottom correlated terms to be displayed.

3. The computer system of claim 1 wherein:
presenting the set of top correlated terms and bottom correlated terms comprises determining one or more suggested query modifications; and
presenting the one or more suggested query modifications to a user.

4. The computer system of claim 1 wherein:
presenting the set of top correlated terms and bottom correlated terms comprises determining one or more suggested query modifications; and
performing a query based on one of the one or more suggested query modifications.

5. The computer system of claim 1 wherein:
determining the set of top correlated terms comprises:
generating a first set of terms in the complement subset;
for each term in the first set of terms, calculating a correlation between the term and the complement subset;
ranking each term of the first set of terms; and
determining the set of top correlated terms based on the ranking of each term, wherein the set of top correlated terms includes terms with a high correlation.

6. The computer system of claim 5 wherein the set of top correlated terms indicates terms that are dominant in the complement subset.

7. The computer system of claim 5 wherein:
determining the set of bottom correlated terms comprises:
determining the set of bottom correlated terms based on the ranking of each term, wherein the set of bottom correlated terms includes terms with a low correlation.

8. A computer program product comprising: a computer-readable storage medium having program instructions embodied therewith, wherein the computer-readable storage medium is not a transitory signal per se, the program instructions readable by a processor system to cause the processor system to perform a method comprising:
performing a query on a document set, wherein documents that satisfy the query comprise a first subset of the document set and documents that do not satisfy the query comprise a complement subset;
calculating a respective correlation between the query and all terms in the complement subset, wherein the correlation is based on a likelihood that a term in the complement set appears in the first subset;
determining a set of top correlated terms, wherein a number of the top correlated terms is a user defined number;
determining a set of bottom correlated terms, wherein a number of the bottom correlated terms is a user defined number; and
presenting the set of top correlated terms and bottom correlated terms to generate an improved query.

9. The computer program product of claim 8 wherein:
presenting the set of top correlated terms and bottom correlated terms comprises causing the top correlated terms and bottom correlated terms to be displayed.

10. The computer program product of claim 8 wherein:
presenting the set of top correlated terms and bottom correlated terms comprises determining one or more suggested query modifications; and
presenting the one or more suggested query modifications to a user.

11. The computer program product of claim 8 wherein:
presenting the set of top correlated terms and bottom correlated terms comprises determining one or more suggested query modifications; and
performing a query based on one of the one or more suggested query modifications.

12. The computer program product of claim 8 wherein:
determining the set of top correlated terms comprises:
generating a first set of terms in the complement subset;
for each term in the first set of terms, calculating a correlation between the term and the complement subset;
ranking each term of the first set of terms; and
determining the set of top correlated terms based on the ranking of each term, wherein the set of top correlated terms includes terms with a high correlation.

13. The computer program product of claim 12 wherein:
determining the set of bottom correlated terms based on the ranking of each term, wherein the set of bottom correlated terms includes terms with a low correlation.

* * * * *